United States Patent [19]

Damm et al.

[11] 4,160,597

[45] Jul. 10, 1979

[54] PHOTOGRAPHIC EASEL

[76] Inventors: Jerry S. Damm; William R. Damm, both of 560 Sixth St., Hollister, Calif. 95023

[21] Appl. No.: 899,064

[22] Filed: Apr. 24, 1978

[51] Int. Cl.$^2$ ............................................. G03B 27/58
[52] U.S. Cl. .................................................... 355/74
[58] Field of Search ..................... 355/54, 32, 77, 72, 355/74

[56] References Cited

U.S. PATENT DOCUMENTS

| 2,915,941 | 12/1959 | Finberg | 355/72 X |
| 2,925,752 | 2/1960 | Van Deusen | 355/54 |
| 3,165,970 | 1/1965 | Pelletier | 355/74 X |
| 3,230,823 | 1/1966 | Krassopoulos | 355/74 |
| 3,262,361 | 7/1966 | Alfonsi | 355/54 |
| 3,944,364 | 3/1976 | Petrini et al. | 355/74 |
| 4,087,174 | 5/1978 | Nishikawa | 355/77 X |

FOREIGN PATENT DOCUMENTS 661942 6/1938 Fed. Rep. of Germany ............. 355/74

Primary Examiner—Donald A. Griffin
Attorney, Agent, or Firm—Huebner & Worrel

[57] ABSTRACT

A photographic easel having a substantially flat panel provided with a rectangular rim having substantially parallel side walls and substantially parallel end walls in which the walls are spaced, respectively, one and two-thirds the length and the width of a rectangular test paper and the easel includes a rectangular flap having an edge substantially parallel to one of the walls and mounted thereon for pivotal movement between a position disposed flatly against the panel and a position retracted therefrom for guided positioning of the paper against the edge and the walls parallel thereto.

4 Claims, 11 Drawing Figures

PHOTOGRAPHIC EASEL

BACKGROUND OF THE INVENTION

1. Field of the Invention

The present invention relates to a photographic easel, and more particularly to such an easel for positioning a photographic test paper so as to bring successive subdivisions thereof into a target area of a photographic enlarger, the easel having particular utility in making color balance test prints.

2. Description of the Prior Art

Devices for successively printing a plurality of photographic prints from a single negative or transparency are well known. The need for such a device is particularly great in color printing where a number of test prints are required to determine the balance of colors which give a final print of the highest possible quality. As is well known, color photographic materials are, in effect, sensitive to the three primary colors. The relative intensity of these colors is controlled by interposing colored filters between the source of light used for printing and the material to be exposed. These filters, typically, are provided in various intensities of the colors yellow, magenta, and cyan. The relative intensity of each of these colors must be varied with the type of color photographic film used for the negative or transparency from which the print is to be made, the type of printing paper, the chemicals used in processing the paper, the type and amount of prior use of the light source used for printing, and the type of lighting and exposure of the initial photograph. The number of variables is increased by the possibilities of varying the exposure with each combination of filters so that a relatively large number of test prints are sometimes required for optimum results.

In any given set of circumstances, however, it is likely that proper color balance can be obtained simply by utilizing filters of the type described to vary the relative intensities of two colors. In this case it is customary first to estimate a filter combination by calculation and from observation of the transparency or negative to be printed. The color balance so selected is then "double bracketed" by using filters giving relatively greater and lesser intensities of each of two colors in all combinations resulting in nine combinations, each requiring a test print. Typically, three of the combinations employ the least intensity of one color, such as yellow, with the least, the estimated, and the greatest intensity of another color, such as magenta. Three more combinations would be the estimated intensity of yellow with the same three intensities of magenta. The final combinations would then be the greatest intensity of yellow with the three relative intensities of magenta.

In making a plurality of test prints it is desirable to place them all on a single sheet of photographic paper for convenience and to insure identical processing. A well-known method of making such prints is to position the paper on an "easel" and project an image to be printed from an enlarger onto the paper. A sheet of paper substantially larger than the image is utilized, and after making each print the paper is moved to dispose a different subdivision thereof to receive the image. The color filter combination is, of course, changed before exposing each subdivision. While elaborate devices are available for large scale commercial printing, the above described method is the usual one used by amateurs. This method is also used by commercial establishments doing limited "runs" or when an "overrun" exceeds the capacity of such elaborate devices. Color printing, preferably, if not necessarily, is carried out in total darkness so that any devices used to position the subdivisions must be simple to manipulate. It is also essential that the positioning of the paper be precisely indexed in relation to the target area on which the image is to be projected. Such indexing is necessary to avoid the undesirable alternatives of overlapping adjacent prints and, when the spaces between the prints are increased to avoid such overlapping, of wasting photographic paper.

Prior art easels providing for the printing of a plurality of prints on a single sheet of photographic paper have serious deficiencies for the above described work in that they are relatively complex, making them expensive and difficult to manipulate in total darkness. Other deficiencies of prior art easels involve indexing for only a limited number of prints. As a result, several papers must be used to obtain sufficient test prints so that repeated processing is required to determine a proper color balance. Still other easels do not provide such indexing at all. These easels require moving the entire easel while projecting the image thereon to position each subdivision to receive the image. Since the paper cannot be exposed during such positioning, such easels must include masking devices for the paper during positioning, increasing the expense of the easel and the inconvenience of using it.

PRIOR ART STATEMENT

Characterizing the closest prior art of which the applicant is aware and in compliance with 37 C.F.R. § 1.97 and § 1.98, attention is invited to the following patents, copies of which are attached:

| U.S. Pat. No. | Inventor | Date |
| --- | --- | --- |
| 2,923,752 | Van Deusen, Jr. | Feb. 23, 1957 |
| 3,230,823 | Krassopoulos | Jan. 25, 1966 |
| 3,262,361 | Alfonsi | July 26, 1966 |
| 3,944,364 | Petrini et al | Mar. 16, 1976 |

The Van Deusen patent is believed relevant in its disclosure of moving photographic paper for making multiple exposures thereon as by an enlarger. The paper is covered by a mask and is mounted in a carrier which moves on a base.

The Krassopoulos patent is thought to be relevant in that it discloses an easel for printing a plurality of photographs on different subdivisions of a sheet of photographic paper by the use of hinged members. The paper is covered during the exposures except for the subdivision being exposed which is revealed by opening an individual hinged door. The easel itself has no provision for indexing the subdivisions into the target area of the projected image.

The Alfonsi patent discloses an enlarging easel in which the paper is moved to expose different subdivisions thereof. The paper is beneath a mask mounted on a carrier. The carrier can only be indexed for four prints on a single sheet.

The Petrini et al patent refers to a printing easel in which photographic paper is moved for exposure of successive subdivisions controlled by a plurality of hinged members. Such a member covers each subdivision except during exposure. No provision is made for indexing the subdivisions into the target area.

SUMMARY OF THE INVENTION

Accordingly, it is an object of the present invention to provide an improved photographic easel for successively making a plurality of prints on a single sheet of photographic paper.

Another object is to provide such an easel which is particularly suited for making color balance test prints, as well as exposure test prints, variable contrast black and white prints, and substantially identical multiple prints.

Another object is to provide such an easel which is adapted for "double bracketing" of two variables in such test printing, such as the relative intensities of two of the primary colors employed in photographic color printing.

Another object is to provide such an easel which positively guides the indexing of different subdivisions of the sheet into the target area for exposure of each print thereon.

A further object is to provide such an easel in which the sheet can be loaded and unloaded conveniently in total darkness.

A further object is to provide such an easel in which the indexing of different subdivisions of the sheet into position for exposure can be achieved conveniently in total darkness.

Additionally an object is to provide such an easel which does not require manipulation of masks, shrouds, paper carriers and the like to expose or shield the different subdivisions of the sheet.

A further object is to provide such an easel which is of economical construction so as to be particularly suitable for use by hobbyists.

A further object is to provide such an easel which is durable and fully effective in performing its intended function.

DESCRIPTION OF THE PREFERRED EMBODIMENT

Figure 1:
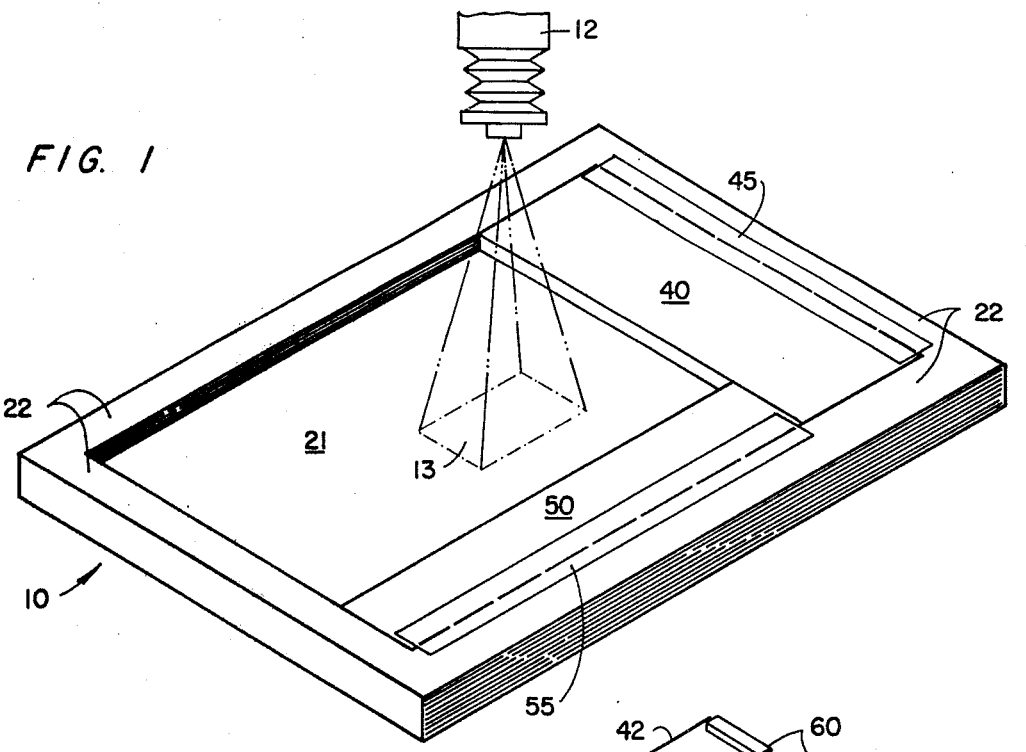
FIG. 1 is a perspective view of a photographic easel embodying the principles of the present invention showing flaps utilized therein in a closed position together with a fragmentarily represented enlarger for projecting an image onto a target area.
Figure 2:
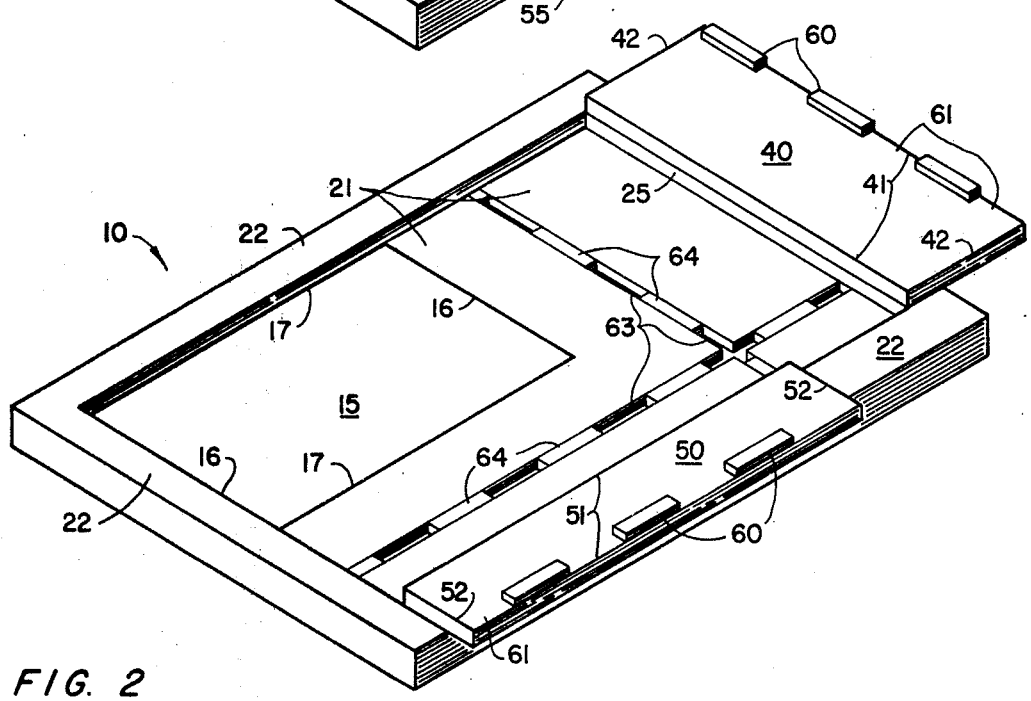
FIG. 2 is a perspective view of the easel with a test paper received thereon and viewed from the same position as FIG. 1 but showing the flaps in retracted positions.
Figure 11:
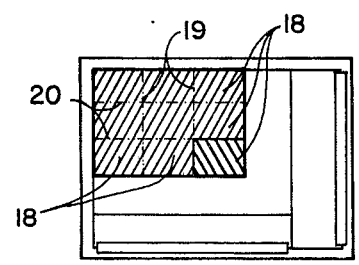

Referring in greater detail to the drawing, the photographic easel of the present invention is designated generally by the numeral 10 in FIGS. 1 and 2. In FIG. 1 is shown a schematically represented photographic enlarger 12 which projects an image to be printed onto a predetermined rectangular target area 13. The easel is dimensioned for use with a rectangular sheet of photographic test paper 15, shown in FIGS. 2 through 11, having a predetermined length and width standard in photographic printing, such as five inches by seven inches. The paper has a pair of parallel longitudinally opposite ends 16 and a pair of parallel transversely opposite sides 17. The paper is considered as having nine congruent, rectangular subdivisions 18, as shown in FIG. 11, successively to be exposed. The subdivisions are defined by a first pair of lines 19 extending parallel to said ends and equally spaced longitudinally of the paper, and by a second pair of lines 20 extending parallel to said sides and equally spaced transversely of the paper.

The easel 10 has a rectangular flat panel 21, best shown in FIG. 2, having predetermined longitudinal and transverse dimensions. The panel forms a base for the easel and is substantially horizontal when the easel is in use. The easel has a rectangular rim 22 extending about the periphery of the panel and upwardly therefrom. The centrally disposed sides of the rim extend substantially parallel to the adjacent sides of the panel and substantially perpendicularly upwardly therefrom. The rim thus forms a pair of opposite parallel end walls 25 disposed at the transversely extending sides of the panel and a pair of opposite parallel side walls 26 disposed at the longitudinally extending sides of the panel. These walls define a substantially rectangular test paper receiving area 30, generally indicated in FIGS. 3 and 8, on the upwardly disposed surface of the panel. The end walls thus define ends of said area and the side walls define sides thereof. When the easel is in use, as shown in FIG. 1, the target area 14 is positioned at the center of said receiving area so that the end walls and side walls, respectively, are oppositely disposed from the target area.

The parallel end walls 25 are spaced longitudinally of the panel 21 substantially one and two-thirds the length of the test paper 15. The distance between the end walls is divided into three equal first linear units. The parallel side walls 26 are spaced transversely of the panel substantially one and two-thirds the width of the test paper, and this distance is divided into three equal second linear units. Said walls are of integral construction with the panel.

The easel 10 has an elongated, substantially rectangular end spacer or spacer flap 40 best shown in FIGS. 1 and 2. The end flap has a length of three of said second linear units and a width of one of said first linear units. The thickness of the flap is substantially equal to the thickness of the rim 22 measured perpendicularly to the panel 21. The flap has a pair of opposite longitudinal edges 41 and a pair of opposite transverse edges 42. The flap is mounted pivotally on one of the end walls 25 with one of the longitudinal edges of the flap extending parallel to the wall in contiguous relation thereto. The end spacer thus extends between the side walls 26, as best shown in FIG. 1. The end flap is pivotally mounted by a hinge 45 on the end wall adjacent thereto. The hinge, preferably, is constructed of a strip of flexible adhesive material such as paper, sheet plastic or fabric extending parallel to the flap and having substantially the same length. The strip is disposed so as to interconnect the surface of the rim 22 disposed oppositely and upwardly from the panel 21 with the surface of the flap adjacent to said edge thereof parallel to the wall.

The end flap 40 is mounted by the hinge 45 for movement between a closed position shown in FIG. 1, in which the flap is engaged with or fitted flatly against the panel 21, and a retracted position shown in FIG. 2 in which the flap is pivoted upwardly from the panel. In the closed position, the longitudinal edge 41 of the flap and the end wall 25 on which the flap is mounted are engaged, and the flap is fitted between the side walls 26. In the retracted position, the flap is pivoted from between the side walls releasing it from engagement therewith and exposing said end wall.

The easel 10 has an elongated, substantially rectangular side or spacer flap 50. The side flap has a length of three of said first linear units and a width of one of said second linear units. The thickness of the side flap is substantially equal to the thickness of the end flap 40. The side flap has a pair of opposite longitudinal edges 51 and a pair of opposite transverse edges 52. The side flap is mounted pivotally on one of the side walls 26 by a hinge 55 similar to the hinge 45 of the end flap 40. Longitudinally of the panel 21, the side flap extends from the longitudinal edge 41 of the end flap opposite to the hinge thereof to the end wall 25 opposite the end flap. The side flap is mounted, similarly to the end flap, for movement between a closed position, shown in FIG. 1, and a retracted position shown in FIG. 2. In the closed position, the side flap is fitted flatly against the panel in engagement therewith between the side walls. In this position the mounting longitudinal edge of the flap is engaged with the side wall on which the flap is mounted, and one of the transverse edges of the flap is contiguous with the end wall 25 oppositely of the end flap. In the retracted position the side flap is pivoted upwardly from between the side walls releasing the flap from engagement with the panel and the side wall on which the panel is mounted and exposing this wall.

The flaps 40 and 50 are each provided with a plurality of elongated rectangular blocks 60, shown in FIG. 2. The blocks extend from the sides of the flaps which are engaged with the panel 21 when the flaps are in their closed positions. The blocks are mounted in longitudinally spaced relation along the longitudinal edge, 41 or 51, of their respective block which is opposite the hinge 45 or 55 of said block. Each block is disposed with its longitudinal axis extending parallel to the longitudinal edge on which it is mounted with one of the longitudinal sides of the block substantially in the plane of said edge. The blocks 60 define receptacles 61 extending longitudinally therebetween on the longitudinal edges of the flaps on which the blocks are mounted. The panel 21 is provided with a plurality of elongated rectangular receptacles 63 to which the blocks 60 are individually fitted. The receptacles of the panel define a plurality of elongated blocks 64 extending longitudinally therebetween. These blocks are dimensioned and proportioned to be received in the receptacles 61 of the flaps. The corresponding blocks and receptacles of each flap and the panel are thus disposed in interfitting relation when the flap is in its closed position.

OPERATION

Figure 3:
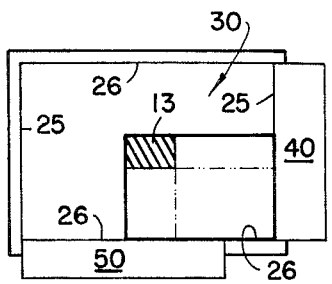
FIGS. 3 through 11 are diagrammatic plan views illustrating indexing of the paper successively to expose subdivisions thereof.
Figure 4:
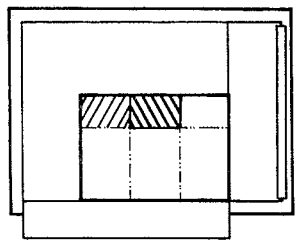

The operation of the described embodiment of the present invention is believed to be clearly apparent and is briefly summarized at this point. Initially, the enlarger 12 is set up in the conventional manner in a darkroom for projecting an image to be printed onto a target area 13. A slide, not shown, is inserted into the enlarger and the enlarger light turned on to project an image onto the target area, as indicated in FIG. 1. The easel 10 of the present invention is then supported in the path of the image in such alignment as to project the image on the target area. The easel is then preferably positioned in relation to the operator as shown in FIG. 3 with the end flap 40 to the right and the side flap 50 at the bottom, that is, toward the operator. The flaps are then pivoted to their retracted positions. A rectangular sheet of focusing paper, whose dimensions are substantially the same as those of a test paper 15 to be printed, is placed on the paper receiving area 30 flatly engaged with the panel 21. The focusing paper is positioned so that one of the sides 17 and one of the ends 16 thereof, respectively, are engaged with the side wall 26 and with the end wall 25 on which the respective flaps 40 and 50 are mounted. The enlarger is then adjusted so that the target area is somewhat smaller than one of the subdivisions 18 of the paper. The enlarger is focused for this target area. The easel, with the focusing paper held engaged therewith as described, is then moved until the target area is disposed on the upper, left-hand subdivision. The easel remains in this position while successive exposures are made on the subdivisions of any desired number of test sheets. At this or some earlier time, the combinations of yellow, magenta, and cyan filters to be used in color balance testing and/or other variables to be tested are determined and a supply of test paper is provided. The darkroom and the enlarger lights are then extinguished.

To print nine successive subdivisions 18 of a sheet of test paper 15, the flaps 40 and 50 of the easel 10 initially are pivoted to their retracted positions. The paper is placed in the receiving area 30 flatly engaged with the panel 21 and with one of the ends 16 and one of the sides 17 thereof, respectively, disposed toward the end wall 25 and the side wall 26 on which the flaps are mounted. The paper is next slid toward the lower, right-hand corner of this area and positioned by engagement with said walls as shown in FIG. 3. This position corresponds to the previously described position of the focusing paper used in setting up the easel so that the target area 13 is now disposed in the upper, left-hand subdivision of the paper. The color filter combination selected for the test print to be made on this subdivision is now placed in the enlarger, and said subdivision is exposed making the first of the successive exposures as indicated by the shading of this subdivision.

The test paper 15 is then moved to the left a sufficient distance that the end flap 40 can be pivoted into its closed position without striking the paper. This flap is then pivoted into such position flatly against the panel with its blocks 60 and receptacles 61 interfitted with the corresponding receptacles 63 and blocks 64 of the panel. The paper is again slid toward the lower, right-hand corner of the receiving area 30. The paper is guided into the position shown in FIG. 4 by engagement with the lower of the side walls 26 and with the longitudinal edge 41 of said flap which is opposite the hinge 45 and is provided with blocks 60. In this position the target area 13 is disposed on the upper, central subdivision of the test paper. This subdivision is then exposed with the selected filter combination to make the second of the successive exposures as indicated by the darker shading of this subdivision. The previously exposed subdivision is indicated by lighter shading.

If the end flap 40 and panel 21 were not provided with the interfitting blocks 60 and 64, and the receptacles therefor, 61 and 63, engagement of an end 16 of the test paper 15 with the longitudinal edge 41 of the flap as described in the preceding paragraph would tend to raise the flap somewhat from its closed position. This tendency would be increased by lack of perfect fit between the flap and the panel. As a result, the paper would intrude between the flap and the panel and would not properly engage the edge of the flap. In this event, the paper would be positioned farther to the right than in the position shown in FIG. 4, resulting in overlapping of the first and second exposures. Such intrusion is prevented by the blocks on the edge of the flap. These blocks engage the paper when it is in substantially the same position in which it is engaged by the edge of the flap when the flap is flatly engaged with the panel.

Figure 5:
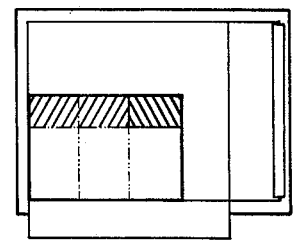
Figure 6:
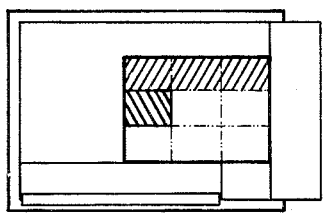
Figure 7:
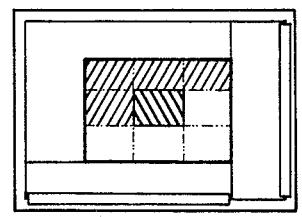

After the second exposure, the test paper 15 is urged to the left and downwardly in the receiving area 30 so as to be guided into the position shown in FIG. 5 by engagement with the lower of the side walls 26 and with the end wall 25 opposite the end flap 40. In this position the target area 13 is disposed for exposure of the right-hand, upper subdivision of the test paper. The selected filters are then inserted into the enlarger and the third successive exposure is made on this subdivision.

At this point, as can be seen by inspection of FIG. 5, three subdivisions 18 in the upper horizontal row thereof have been successively exposed.

Next, the end flap 40 is pivoted to its retracted position to expose the end wall 25 on which the hinge 45 is mounted. The paper 15 is then moved upwardly in the receiving area 30 beyond the blocks 64 and receptacles 63 parallel to the side walls 26, and the side flap 50 is pivoted to its closed position. The paper is then urged downwardly and to the right so as to engage the right-hand side wall and the longitudinal edge 51 of the side flap opposite of the hinge 55. In the manner previously discussed in connection with the end flap, the blocks 60 on the edge of the side flap on which the paper is guided prevent intrusion of the test paper between the side flap and the panel. The paper is then guided by said engagement into the position shown in FIG. 6 for exposure of the fourth successive subdivision through the selected filter combination.

The test paper 15 is now moved to the left beyond the receptacles 63 parallel to the end walls 25 and the end flap 40 pivoted into its closed position. In this position, the end flap is disposed between the end wall on which it is mounted and the tranverse edge 52 of the side flap 50 disposed toward said end wall. The paper is again urged downwardly and to the right for guided positioning by the longitudinal edges, 41 and 51, respectively, of the end and side flaps oppositely disposed from their respective hinges. These edges guide the paper into the position shown in FIG. 7. In this position the central subdivision 18 of the paper is disposed in the target area 13. The selected filter combination, normally the combination on which the "double bracketing" is based, is inserted into the enlarger, and the fifth successive exposure of one of the subdivisions is made.

Figure 8:
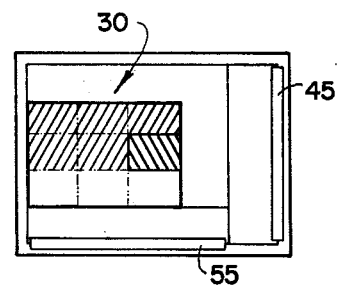
Figure 9:
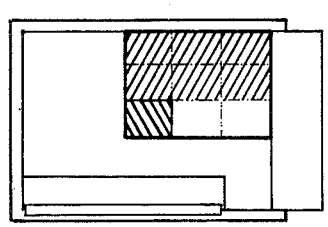
Figure 10:
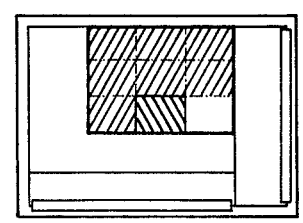

The sixth of the successive subdivisions 18 is then positioned into the target area, as shown in FIG. 8, by sliding the test paper 15 to the left and into engagement with the end wall 25 opposite of the end spacer 40. The selected color filter pack is then inserted into the enlarger 12 and the exposure is completed. At this point the central horizontal row of subdivisions has been completely exposed.

The end flap 40 is now pivoted to its retracted position exposing the right-hand end wall 25 and the sheet of test paper 15 is urged upwardly and to the right into engagement with said end wall and with the upper side wall 26. This engagement guides the paper to the position shown in FIG. 9 with the lower, left-hand subdivision disposed in the target area for the seventh successive exposure.

After this exposure is made using the selected color filters, the paper 15 is moved to the left, and the end flap 40 is lowered into its closed position. The paper is then engaged with this flap and with the upper side wall 26, thereby guiding the paper into the position shown in FIG. 10 for exposure of the eighth of the successive subdivisions 18.

When this exposure is made the paper 15 is slid to the left along the upper side wall 26 into engagement with the left-hand end wall 25. The paper is now positioned for exposure of the ninth and final subdivision 18 as shown in FIG. 11. When three rows of three subdivisions are thus successively exposed, the paper is removed for further processing.

If a color test is being made, the best estimates of the proper color filters are selected for the central subdivision. For example, these might be 60 yellow, 25 magenta and 35 cyan. if the yellow and magenta are to be tested, the cyan can be set on 35 for all 9 subdivisions and the yellow and magenta adjusted to bracket the best estimates. Thus, the upper horizontal line of subdivisions might be set at M-O, the middle horizontal line of subdivisons at M-25 and the lower horizontal line of subdivisions at M-50. The yellow can be conveniently bracketed by exposing the left vertical row of subdivisions to Y-35, the middle vertical row to Y-60 and the right vertical row to Y-85. Visual reference to the resulting prints permits ready selection of the filter combination desired.

Similarly, the easel 10 can be used to test desired light intensity of exposure, exposure time, black and white contrast and other variables.

Positioning the paper 15 to expose each of the nine subdivisions 18 requires no manipulation other than movements of the flaps 40 and 50 between their closed and retracted positions and the sliding of the paper into engagement with the flaps and with the walls 25 and 26. Placing the paper into the receiving area 30 is facilitated since the area is depressed below the rim 22. Since these manipulation are simple, and the walls and flaps of the easel are relatively large and distinctively shaped, only the tactile sense is required to dispose the paper for successive test prints. As a result, the easel 10 of the present invention can be utilized conveniently in total darkness. No mask is required for the subdivisions not being exposed since the image is concentrated by the enlarger 12 onto the target area and does not "bleed over" into the adjacent subdivisions.

It is to be understood that additional flaps, similar to the flaps 40 and 50, could be mounted on the end wall 25 and on the side wall 26 which are opposite, respectively, of the end flap and the side flap. By providing such additional flaps and by suitably proportioning and dimensioning all of said flaps and walls a test paper can be indexed so as to provide more than nine subdivisions thereof for successive test exposures. The manipulations to achieve such indexing can of course be accomplished by the tactile sense alone.

It is also to be understood that while hinges, such as 45 and 50, preferably are utilized to provide releasable engagement of the spacers or flaps 40 and 50, other releasable devices such as slidable or wholly removable spacers can be utilized to dispose subdivisions 18 of a test paper 15 for successive exposures.

Although the invention has been herein shown and described in what is conceived to be the most practical and preferred embodiment, it is recognized that departures may be made therefrom within the scpoe of the invention, which is not to be limited to the illustrative details disclosed.

Having described our invention, what we claim as new and desire to secure by Letters Patent is:

1. In a photographic easel having a flat panel, and a wall integral with the panel defining a side of a test paper receiving area and along which wall a test paper can be adjustably positioned to bring subdivisions thereof successively into a predetermined target area within the receiving area; a substantially rectangular spacer flap fitted against the wall; and hinge means mounting the flap on the wall for pivotal movement between a position flatly against the panel and a position retracted therefrom, said flap having an edge substantially parallel to the wall disposed for adjustable positioning of the paper therealong when the flap is flatly against the panel and exposing said wall for adjustable positioning of the paper therealong when the flap is retracted.

2. A photographic easel comprising:
A. a substantially flat panel;
B. a rectangular rim integral with the panel having substantially parallel side walls and substantially parallel end walls, the end walls being spaced a multiple of a first linear unit and the side walls being spaced a multiple of a second linear unit;
C. a rectangular end flap having a longitudinal edge pivotally mounted on an end wall for movement between a position with the flap disposed flatly against the panel and fitted between the side walls, with said longitudinal edge engaged against the end wall on which it is mounted and a retracted position pivoted upwardly from the panel and from between the side walls, said flap being of a first linear unit in width; and
D. a rectangular side flap having a longitudinal edge pivotally mounted on a side wall for movement between a position with the flap disposed flatly against the panel and fitted between an end wall and the end flap when the end flap is against the panel with said longitudinal edge engaged against the side wall on which it is mounted and a retracted position pivoted upwardly from the panel and from between the end wall and the end flap, said side flap being of a second linear unit in width.

3. A photographic easel comprising:
A. a substantially flat panel;
B. a rim integral with the panel having substantially parallel first walls and substantially parallel second walls;
C. a second flap having a longitudinal edge pivotally mounted on a second wall for movement between a position with the flap disposed flatly against the panel between the first walls, with said longitudinal edge engaged against the second wall on which it is mounted and a retracted position pivoted upwardly from the panel and from between the first walls; and
D. a first flap having a longitudinal edge pivotally mounted on a first wall for movement between a position with the flap disposed flatly against the panel between a second wall and the second flap when the second flap is against the panel with said longitudinal edge engaged against the first wall on which it is mounted and a retracted position pivoted upwardly from the panel and from between the second wall and the second flap.

4. A photographic easel comprising:
A. a substantially flat panel;
B. a rectangular rim integral with the panel having substantially parallel side walls and substantially parallel end walls;
C. a rectangular end flap having a longitudinal edge pivotally mounted on an end wall for movement between a position with the flap disposed flatly against the panel between the side walls, with said longitudinal edge engaged against the end wall on which it is mounted and a retracted position pivoted upwardly from the panel and from between the side walls; and
D. a rectangular side flap having a longitudinal edge pivotally mounted on a side wall for movement between a position with the flap disposed flatly against the panel between an end wall and the end flap when the end flap is against the panel with said longitudinal edge engaged against the side wall on which it is mounted and a retracted position pivoted upwardly from the panel and from between the end wall and the end flap.

* * * * *